United States Patent
Egan et al.

(10) Patent No.: US 8,473,484 B2
(45) Date of Patent: Jun. 25, 2013

(54) IDENTIFYING IMPACT OF INSTALLING A DATABASE PATCH

(75) Inventors: Randy L. Egan, Rochester, MN (US); Rafal P. Konik, Oronoco, MN (US); Roger A. Mittelstadt, Byron, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 13/150,578

(22) Filed: Jun. 1, 2011

(65) Prior Publication Data

US 2012/0310921 A1    Dec. 6, 2012

(51) Int. Cl.
*G06F 17/30* (2006.01)
(52) U.S. Cl.
USPC .......................................... 707/718; 707/769
(58) Field of Classification Search
USPC .................... 707/713–740, 765–775
See application file for complete search history.

(56) References Cited

U.S. PATENT DOCUMENTS

| 2005/0154740 | A1* | 7/2005 | day et al. ...................... 707/100 |
| 2010/0005340 | A1* | 1/2010 | Belknap et al. ................. 714/37 |
| 2011/0153594 | A1* | 6/2011 | Hagenbuch et al. .......... 707/718 |

OTHER PUBLICATIONS

"SQL Plan Management in Oracle Database 11g," An Oracle White Paper, Nov. 2010.

* cited by examiner

*Primary Examiner* — Wilson Lee
(74) *Attorney, Agent, or Firm* — Patterson & Sheridan, LLP

(57) ABSTRACT

Techniques are disclosed for identifying impact of a patch. One embodiment of the invention provides a DBMS that is configured to manage one or more databases. The DBMS may receive a request to evaluate a patch for the DBMS. The DBMS provides a first execution environment that is not based on the patch and a second execution environment that is based on the patch. For each query, the DBMS compares a first access plan with a second access plan, where the first access plan is generated from the first execution environment and the second access plan is generated from the second execution environment. The DBMS identifies one or more queries having differing access plans, based on the comparisons.

20 Claims, 6 Drawing Sheets

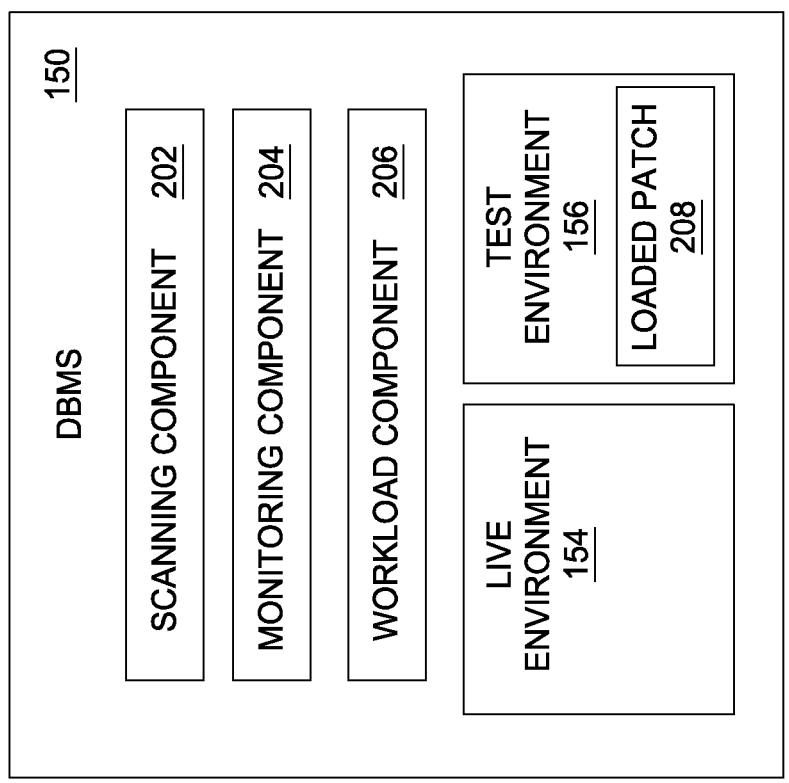

Workload Report:

Query workload breakdown:
1002 Queries Run. ~302          ~306
990 queries will run with same plan - click to list queries. ~304
10 queries executing with a different access plan but with an estimated execution time within acceptable parameters* - click to see queries and access plans. ~308          ~310
1 query executing with a different access plan but with an estimated execution time not within acceptable parameters* - click to see queries and access plans. ~312          ~314

Last actual run of workload:
6 hours and 35 minutes. ~316

318 Estimated execution time subsequent to installing the patch:
6 hours and 55 minutes - execution time approaching 7-hour limit set by the customer          319
          320

* - Acceptable runtime is set by the customer (currently defined as execution time being within 5% of last actual execution time of the query) ~309

FIG. 3A

Query Report:

Details regarding the 1 query executing with a different access plan but with an estimated execution time not within acceptable parameters:

Query to be run 40 times with estimated run time of 30 seconds longer for each execution:

356 {
select *
from table1
where customer# = '123456789'
}

358 {
*Current query access plan* (1 second):
**** Starting optimizer messages for query.
Query options used to build the query access plan:
Keyed sequence access path with index IDX1 was used by the query.
Query options retrieved file QAQQINI in library QTEMP.
**** Ending message for query.
}

360 {
*New query access plan* (31 seconds):
**** Starting optimizer messages for query.
Query options used to build the query access plan:
Arrival sequence access path was used for table TABLE1.
Query options retrieved path file QAQQINI in library QTEMP.
**** Ending messages for query.
}

FIG. 3B

IDENTIFYING IMPACT OF INSTALLING A DATABASE PATCH

BACKGROUND

Databases are computerized information storage and retrieval systems. The most prevalent type of database is the relational database, a tabular database in which data is defined so that it can be reorganized and accessed in a number of different ways.

Regardless of the particular architecture, in a database management system (DBMS), a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

SUMMARY

Embodiments of the invention provide a computer-implemented method, computer program product and system for performing an operation that includes receiving a request to evaluate a patch for a database management system (DBMS) configured to manage a database. The DBMS provides a first execution environment that is not based on the patch. The database includes a first plurality of access plans generated based on the first execution environment. The operation also includes providing a second execution environment in the DBMS, based on the patch. The operation also includes generating a second plurality of access plans based on the second execution environment. The operation also includes comparing the first plurality of access plans with the second plurality of access plans to identify one or more queries impacted by the patch.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 2 is a block diagram illustrating components of a database management system (DBMS), according to one embodiment of the invention.

FIGS. 3A-3B illustrate reports generated by the DBMS, according to one embodiment of the invention.

DETAILED DESCRIPTION

Figure 1:
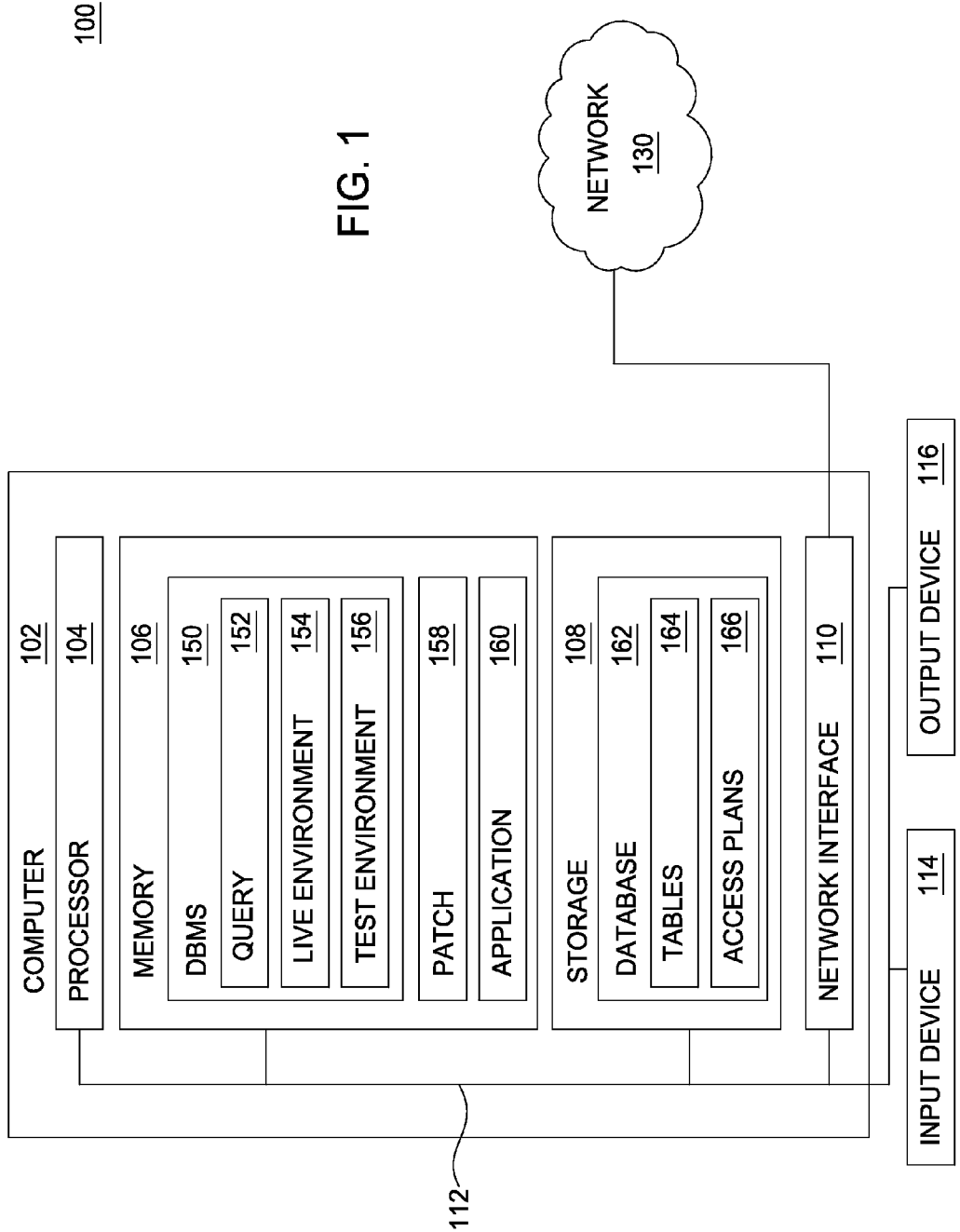
FIG. 1 is a block diagram illustrating a system for identifying impact of a database patch, according to one embodiment of the invention.

Embodiments of the invention provide techniques for identifying impact of installing a patch for a database management system (DBMS). As used herein, a database patch refers to any update to a database management system (DBMS). The database patch may update or replace one or more modules associated with the DBMS. Examples of modules include files stored in a filesystem and system objects stored in a database. Depending on the embodiment, the database patch may also include an executable (such as an installer application) to facilitate updating the DBMS. In one embodiment, the DBMS receives a request to evaluate a patch without installing the patch. In response, the DBMS may load the patch into a test environment provided by the DMBS. The DBMS may then identify one or more queries that the patch would impact when installed. The one or more queries may be identified via access plans associated with the one or more queries, where the access plans are generated by the DBMS. Each access plan specifies an order of operations for accessing data for a respective query. An access plan may also be referred to as a query execution plan or query plan.

In one embodiment, a patch is considered to impact (or affect) a query when a different access plan is generated from the query subsequent to installing the patch, as compared to an access plan generated from the query prior to installing the patch. Put another way, if an identical access plan is generated from the query both before and after installing the patch, then the patch is not considered to impact (or affect) the query. In other embodiments, a patch is considered to impact a query when other characteristics associated with the query are changed, even if an identical access plan is generated. The DBMS may notify an administrative user of any identified queries. Depending on the embodiment, the notification may also specify in what ways the identified queries would be impacted after the patch is installed. Accordingly, the administrative user may more efficiently and/or conveniently access information relevant to deciding whether and/or how to proceed with a patch that is to be installed for the DBMS. In particular, the relevant information may be provided to the administrative user without requiring two separate instances of the DBMS to be provided and maintained (i.e., a first instance that is not patched and a second instance that is patched). Instead, a single instance of the DBMS is provided that can evaluate queries against a patched execution environment while executing queries against an unpatched execution environment. Further, the relevant information may be provided to the administrative user without requiring any of the access plans to be manually retrieved and/or compared. In particular, the administrative need not issue any commands to retrieve the access plans. Examples of issued commands include an EXPLAIN command and a PRTSQLINF command, both of which are configured to retrieve an access plan for a given query. Further, the administrative user need not manually compare or issue any commands for comparing the retrieved access plans.

The following examples are provided to illustrate how the information facilitates a user decision on how to proceed with a patch that is to be installed for the DBMS. An administrative user who is reluctant to install a patch may willingly install the patch upon receiving a notification that no queries would be impacted when the patch is installed. Alternatively, suppose that the administrative user receives a notification specifying that a query would be impacted. Before installing the patch, the administrative user may perform one or more actions such that the query would no longer be impacted or such as to mitigate an extent to which the query is impacted. The one or more actions may include modifying the query, creating one or more indexes, reconfiguring a query optimizer component of the DBMS (such as by specifying hints), etc. The techniques herein may also be used after the one or more actions are performed, to verify that the query would no longer be impacted. Still alternatively, the administrative user may investigate the specified query to measure an associated business impact. In some cases, the administrative user may determine that keeping the DBMS up-to-date by installing the patch outweighs any negative business impact of the affected query. Accordingly, the techniques herein help the administrative user keep the DBMS up-to-date more efficiently and/or conveniently at least in some cases. Keeping the DBMS up-to-date may also reduce support costs incurred by a vendor of the DBMS.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a DBMS may execute in the cloud, the DBMS being configured to manage one or more databases. Having the DBMS in the cloud allows the user to access the databases from any computing system attached to a network connected to the cloud (e.g., the Internet).

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for identifying impact of a database patch, according to one embodiment of the invention. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 114 may be any device for providing input to the computer 102. For example, a keyboard and/or a mouse may be used. The output device 116 may be any device for providing output to a user of the computer 102. For example, the output device 116 may be any conventional display screen or set of speakers. Although shown separately from the input device 114, the output device 116 and input device 114 may be combined. For example, a display screen with an integrated touch-screen may be used.

As shown, the memory 106 of the computer 102 includes a database management system (DBMS) 150 configured to manage a database 162 stored in the storage 108 of the computer 102. The memory 106 also includes a patch 158 to be installed for the DBMS 150. The memory 106 also includes an application 160 configured to access the database 162 via the DBMS 150. In other embodiments, the application 160 executes on a different computer that communicates with the computer 102 via the network 130. The DBMS 150 includes a query 152 received from the application 160, a live environment 154 for executing queries, and a test environment 156 for executing queries. The database 160 includes tables 164 and access plans 166. The DBMS 150 may include a query optimizer (not shown) that generates each access plan 166 based on a respective query. As described above, each access plan 166 specifies an order of operations for accessing data for the respective query. Although embodiments are described herein with reference to the DBMS 150 identifying impact of installing the patch 158, in other embodiments, some or all of the functionality of the DBMS 150 may be performed by a standalone application configured to communicate with the DBMS 150.

FIG. 2 is a block diagram illustrating components 200 of the DBMS 150 of FIG. 1, according to one embodiment of the invention. As shown, the components 200 include a scanning component 202, a monitoring component 204, a workload component 206, the live environment 154, and the test environment 156. The components 200 may be configured to evaluate the patch 158 without installing the patch 158 to an execution environment used for executing queries. To this end, the DBMS 150 may analyze the patch 158 to identify modules of the DBMS 150, that the patch is configured to modify or replace. The DBMS 150 may then create the test environment 156 by creating a copy of the identified modules. The DBMS 150 may then load the patch 158 into the test environment 156, allowing the patch 158 to update and/or replace the copy of the identified modules in the test environment 156. The patch 158 is loaded without installing the patch 158 for the DBMS 150; put another way, none of the original modules in the live environment 156 are modified or replaced. Depending on the embodiment, the DBMS 150 may segregate the live environment 154 and the test environment 156 by maintaining an entry point table in the database, where the table associates the respective modules for each execution environment. Further, the segregation may occur at a filesystem level and/or at a database level. The modules correspond to files at the filesystem level and system objects at the database level.

In one embodiment, segregating the environments at the filesystem level includes creating a folder or archive specific to the test environment 156, the folder containing a copy of those files associated with the DBMS 150, that the patch is configured to modify or replace. In some embodiments, the folder or archive need not be created, and the DBMS 150 merely creates the copy in the same folder in which the original files are stored. In such cases, the DBMS 150 may differentiate the copy from the original files by modifying any attribute associated with the copy, such as the filename or other metadata. For instance, the DBMS 150 may modify the filename to include a predetermined sequence of characters, e.g., ".test", "TEST-", etc.

In one embodiment, segregating the environments at the database level may include creating a copy of system objects that the patch 158 is configured to modify and/or replace. The copy of the system objects may be stored in a newly created container for the test environment 156. Examples of containers include a database package, a database namespace, a database library, etc. In some embodiments, the container need not be created, and the DBMS 150 merely creates the copy in the same container in which the original system objects are stored in the database.

Depending on the embodiment, the live and test environments may not necessarily be used for executing access plans. The time taken to execute a given access plan may often be orders of magnitude greater than the time taken to generate the given access plan in the first place. Accordingly, executing access plans against the live and test environments to identify impacted queries may be cost prohibitive in many cases. Accordingly, in some embodiments, the live and test environments are used only in generating access plans from queries and not in executing the generated access plans. In one embodiment, the test environment is not used for executing any access plan. To compare execution times of access plans from the live and test environments, respectively, the DBMS 150 may retrieve a last logged execution time of the access plan in the live environment, rather than executing the access plan at the time that the DBMS 150 seeks to compare execution times. Further, the DBMS 150 may determine an estimated cost of an access plan generated from the test environment, the estimated cost being expressed in terms of execution time. Accordingly, the execution times of the access plans may be compared without incurring the cost of executing the access plans for the purpose of the comparison.

In one embodiment, to execute the query 152 received from the application 160, the DBMS 150 generates an access plan based on the query 152. The DBMS 150 may then execute the access plan to retrieve data responsive to the query 152. To generate the access plan, the DBMS 150 may perform operations such as determining whether the syntax and/or semantics of the query are correct, determining an access path to use (e.g., arrival sequence or keyed sequence), determining which indexes to use to access the data, determine an order in which to join tables referenced by the query 152, etc. An arrival sequence access path refers to retrieving records based on a physical ordering in which the records are stored in the database, while a keyed index access path refers to retrieving records based on a logical ordering as specified by one or more indexes. Further, the query 152 may be a static query or a dynamic query. A static query refers to a query which structure is known prior to execution time of the application issuing the query. For example, the structure of the static query may be known at a time of compiling the application. For textual queries, the structure refers to the full text of the query, including column names, table names, etc. A dynamic query refers to a query which structure is not known until execution time of the application issuing the query.

In one embodiment, because the structure of the static query is known in advance, the DBMS 150 can generate and stores an access plan for the static query prior to execution time of the application. Further, the access plan may be reusable even if the database is restarted. Accordingly, responsive to receiving the static query for execution, the DBMS 150 may execute the stored access plan. Depending on the embodiment, the DBMS 150 may also store the static query in one or more packages of the database 162. In some embodiments, in addition to issuing queries against the database 162, an application may also invoke stored procedures in the database. The stored procedures may be created by an application developer and may include static queries.

In contrast to the static query, because the structure of the dynamic query is not known in advance, the DBMS 150 dynamically generates an access plan prior to executing each received dynamic query. Dynamically generating the access plan refers to generating the responsive to receiving the dynamic query for execution. In other words, the DBMS 150 does not generate any access plan for a dynamic query until the dynamic query is received for execution.

In one embodiment, the scanning component 202 is configured to operate on static queries, while the monitoring component 204 is configured to operate on dynamic queries. Because the workload component 206 is configured to operate any access plan, the workload component 206 may be used on for both static queries and dynamic queries. The scanning component 202 searches for static queries and/or access plans stored in the database 162. Although each static query is assumed to have a corresponding access plan that is generated based on the live environment 154, the DBMS 150 can dynamically generate any access plan not found to be present. The DBMS 150 also stores associations between each query and an access plan that is generated using the respective query. The stored associations may be used to identify a query based on an access plan, and vice versa.

In one embodiment, for each static query, the scanning component 202 requests the DBMS 150 to generate an access plan based on the test environment, where the test environment includes the loaded patch 208. Accordingly, each static query in the database has a first access plan that is not generated based on the loaded patch and a second access plan that is generated based on the loaded patch. The first access plan may be referred to as a production plan, and the second access plan may be referred to as a comparison plan.

In one embodiment, after the access plans are generated based on the loaded patch, the scanning component 202 identifies each static query having associated access plans that differ as a result of the loaded patch 208. To this end, the scanning component 202 may scan all entities in the database 162 that may contain static queries. In one embodiment, such entities include all programs, packages, and/or plan caches stored in the database. The associated access plans may differ in terms of implementation options such as which indexes are used, in what order tables are joined, what join algorithm is used for joining tables, etc. Examples of join algorithms include nested loop join, sort-merge join, hash join, and star join.

In one embodiment, the associated access plans may also differ in terms of other characteristics such as estimated time for executing the access plan, actual time taken to execute the access plan, and resource usage levels associated with executing the access plan. The estimated time for executing the access plan may be determined by an estimator component of the DBMS 150. To this end, the estimator component may consider factors such as a count of instructions in the access plan, a count of seeks that the access plan incurs, a count of page transfers that the access plan incurs, etc. The actual time taken to execute the access plan by a query engine of the DBMS 150 may be recorded by a logging component of the DBMS 150. The logging component may also record resource utilization associated with executing the access plan. Resource utilization may be qualified by a particular resource type, such as by processor utilization, memory utilization, disk utilization, and/or network utilization.

In one embodiment, the scanning component 202 may also perform one or more operations to process queries and/or access plans based on user-defined criteria. In alternative embodiments, some or all of the functionality associated with the one or more operations may be performed by an exit program invoked by the scanning component 202. The exit program refers to any subroutine invoked by a scanning component 202 upon occurrence of a predefined event during execution of the scanning component 202. A developer of the patch 158 may provide customized functionality by defining the subroutine. The exit program may also be referred to as a user exit and may be provided by the path developer as part of the patch 158. In one embodiment, the DBMS 150 invokes the exit program subsequent to comparing the production and comparison plans for each query. The exit program may be invoked for static queries, dynamic queries, and/or access plans.

To illustrate the exit program, assume that the patch 158 is configured to correct an error that may lead to erroneous query results for queries containing a subquery that includes a GROUP BY clause. The GROUP BY clause is configured to project rows having common values into a smaller set of rows. The GROUP BY is often used in conjunction with query aggregation functions or to eliminate duplicate rows from a result set. In one embodiment, the developer of the patch 158 may provide an exit program that determines whether the patch 158 is loaded and that identifies queries and/or access plans having the specified structure of containing a subquery that includes a GROUP BY clause. When executed, the exit program generates a notification specifying that an error is present in the DBMS 150 that may cause the identified queries to yield erroneous query results. The notification may also specify that the patch 158 is intended to correct the error in the DBMS 150.

In one embodiment, the user-defined characteristics are specified by a developer of the patch 158. The user-defined characteristics may pertain to a static query or to an access plan associated with the static query. For example, the user-defined characteristics may include query attributes, data types, and access plan implementation options. Exemplary data types include an application encoding schemes and special registers. Application encoding schemes specify a type of encoding for data stored in the database. Application encoding schemes may also be referred to as Coded Character Set Identifiers (CCSIDs). Special registers refer to DBMS-defined variables that can be referenced in queries. Exemplary query attributes include whether a query includes an embedded subquery, whether a query references a derived table, whether the query references a view, etc.

In one embodiment, the monitoring component 204 may perform some or all of the functionality of the scanning component 202. However, unlike the scanning component 202, which operates on static queries, the monitoring component 204 operates on dynamic queries. The DBMS 150 generates a production plan for each dynamic query issued against the DBMS 150. The monitoring component 204 may also request the DBMS 150 to generate a comparison plan for each dynamic query. The monitoring component 204 may then identify each dynamic query having differing production and comparison plans.

In one embodiment, the scanning component 202 and/or the monitoring component 204 may cache, for each query and patch, the determination of whether the query is impacted by the patch. Accordingly, the comparison operations of the scanning component 202 and/or the monitoring component 204 need not be repeated when a second instance of the query is subsequently received. Instead, the scanning component 202 and/or the monitoring component 204 may retrieve the cached determination for the second instance of the query. The determination may be stored in the database 162, in the form of a flag associated with both the query and the patch. Absence of a flag for a given query and patch may indicate that the given query has not yet been evaluated against the patch.

In one embodiment, the workload component 206 may log all queries executed within a predefined processing window. The logged queries may include both static queries and dynamic queries. The workload component 206 may also log metrics associated with executing each query during the predefined processing window. The metrics may include a count of how many times a given query is executed during the predefined processing window. The metrics may also include, for each execution of the given query, the duration of the respective execution. Once the processing window elapses, the workload component 206 analyzes the logged queries and/or metrics to generate a difference in elapsed time between each production plan and the corresponding comparison plan. The workload component 206 may also generate a difference in resource utilization between each production plan and the corresponding comparison plan. The resource utilization may be qualified by a particular resource type, as described above.

In one embodiment, the workload component 206 may also generate an indication of system impact of the patch 158. The indication of system impact characterizes an overall impact of the patch 158 on queries executed by the DBMS 150 and, by extension, the applications accessing the database 162 via the DBMS 150. The indication of system impact may be expressed as a numeric value that falls within a predefined range specified by a user. In some embodiments, the indication of system impact may also be selected from a predefined set of distinct indications. Each indication may be associated with a respective, disjoint subset of the predefined range. In one embodiment, each indication characterizes the system impact: (i) as a positive impact or a negative impact and (ii) qualifies the positive or negative impact as low impact, medium impact, or high impact.

In one embodiment, an indication may be selected based on the difference between the logged metrics of the production and comparison plans. For example, the indication of high negative impact may be selected if executing the comparison plan takes thirty minutes longer than the production plan. The difference between the logged metrics of the production and comparison plan may be expressed as a value or as a percentage. For example, the indication of high negative impact may be selected if executing the comparison plan takes more than fifty percent longer than the production plan.

Alternatively, an indication may be selected based on the logged metric of the comparison plan. For example, the indication of high negative impact may be selected if executing the comparison plan takes over seven hours. In one embodiment, the DBMS 150 generates one or more reports based on the indications. The reports may also contain other information accessed or generated by the components 200 of the DBMS 150. The reports may include a workload report and a query report.

FIG. 3A illustrates a workload report 300, according to one embodiment of the invention. The workload report 300 includes a total count 302 of queries for which production plans and comparison plans were evaluated. The workload report 300 also includes a total count 304 of queries for which production plans matched the comparison plans. The workload report 300 also provides a user-selectable option 306 to output the queries within the total count 304. The workload report 300 also includes a total count 308 of queries for which: (i) productions plans differ from the comparison plans and (ii) the comparison plan is estimated to execute within acceptable parameters specified by a user via a definition 309. For example, the user may define acceptability as whether estimated execution time for a comparison plan is not more than five percent longer in duration than a last recorded actual execution time for a corresponding production plan.

As shown, the workload report 300 provides a user-selectable option 310 to output the queries within the total count 308. The workload report 300 also includes a total count 312 of queries for which: (i) production plans differ from the comparison plans and (ii) the comparison plan is estimated to execute outside of the acceptable parameters specified by the user. The workload report 300 also provides a user-selectable option 314 to output the queries within the total count 312 and/or associated access plans.

As shown, the workload report 300 includes a logged execution time 316 of a user-defined query workload in the live environment 154. Depending on the embodiment, the user-defined query workload includes one or more queries within the total count 302 and, for each included query, an associated count of desired executions of the respective included query. The workload report 300 also includes an estimated execution time 318 of the user-defined query workload in the test environment 156. The workload report 300 may also include an indication 319 of whether the estimated execution time 318 exceeds or is approaching a user-defined threshold 320. As shown, the user-defined threshold 320 is specified as seven hours. For example, assume that the user-defined query workload is for reconciling daily bank receipts. In this example, the threshold 320 of seven hours may represent the amount of time that a bank has to reconcile receipts for a given day or risk facing a government fine. The user-defined threshold 320 may be tailored to suit the needs of a particular case.

FIG. 3B illustrates a query report 350 for a query, according to one embodiment of the invention. The DBMS 150 may generate the query report 350 in response to user selection of the option 314 of FIG. 3A. The query report 350 includes a total count 352 of how many times the query is to execute as part of the user-defined query workload. The query report 350 also includes an indication 354 of how much longer the query is estimated to run in the test environment 156, relative to a logged, actual execution time of the query against the live environment 154. The query report 350 also includes a full text 356 of the query, details 358 on the production plan associated with the query, and details 360 on the comparison plan associated with the query. The details 358 include a logged, actual execution time 362 of the query against the live environment 154. On the other hand, the details 360 include an estimated execution time 366 of the query against the test environment 156. The details 358 also include an indication 364 that the query uses a keyed sequence access path to access data when executing in the live environment 154. In contrast, the details 360 include an indication 368 that the query uses an arrival sequence access path when executing in the test environment 156.

Accordingly, the change in access path may be the cause of the additional execution time incurred by the query when executing in the test environment 156 with the applied patch, relative to the live environment 154. By providing the workload report 300 and the query report 350 to an administrative user, the DBMS 150 may help the administrative user determine what actions, if any, should be taken prior to installing the patch for the live environment 154. For example, the administrative user may analyze the query and/or the database further to determine an underlying cause of the change in the access path used by the query.

Figure 4:
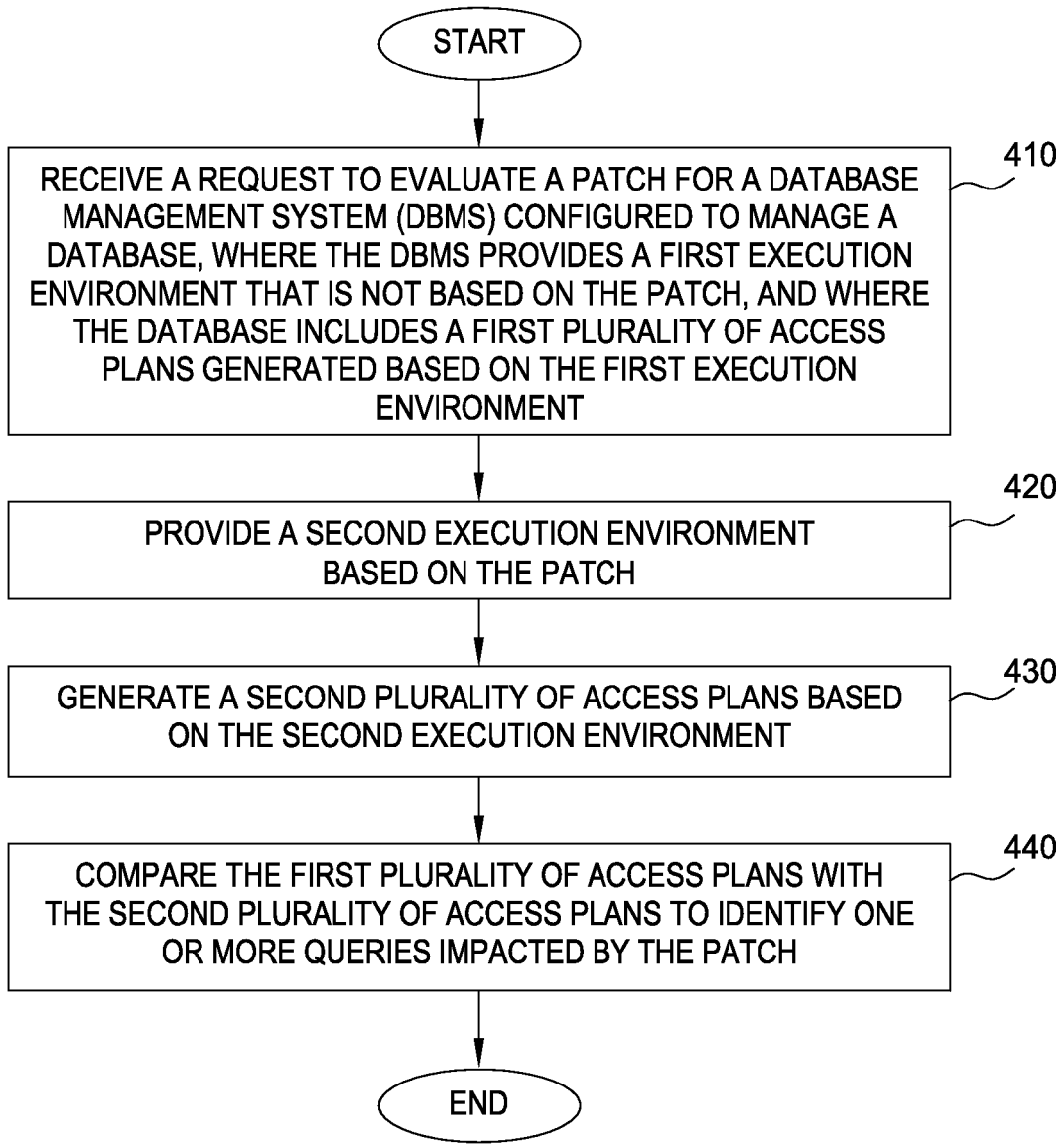
FIG. 4 is a flowchart depicting a method for identifying impact of installing the database patch, according to one embodiment of the invention.

FIG. 4 is a flowchart depicting a method 400 for identifying impact of installing the patch 158 of FIG. 1, according to one embodiment of the invention. As shown, the method 400 begins at step 410, where the DBMS 150 receives a request to evaluate a patch for the DBMS 150, where the DBMS 150 is configured to manage the database 162. Further, the DBMS 150 provides a first execution environment that is not based on the patch. The first execution environment corresponds to the live environment 154 of FIG. 1. The database includes production plans generated based on the live environment 154.

At step 420, the DBMS 150 provides a second execution environment based on the patch. The second execution environment corresponds to the test environment 156 of FIG. 1, and the test environment 156 includes the loaded patch. At step 430, the DBMS 150 generates comparison plans based on the test environment 156. At step 440, the DBMS 150 compares the production plans with the comparison plans to identify one or more queries impacted by the patch. The one or more queries may also be identified based on stored associations between queries and access plans. After the step 440, the method 400 terminates.

Figure 5:
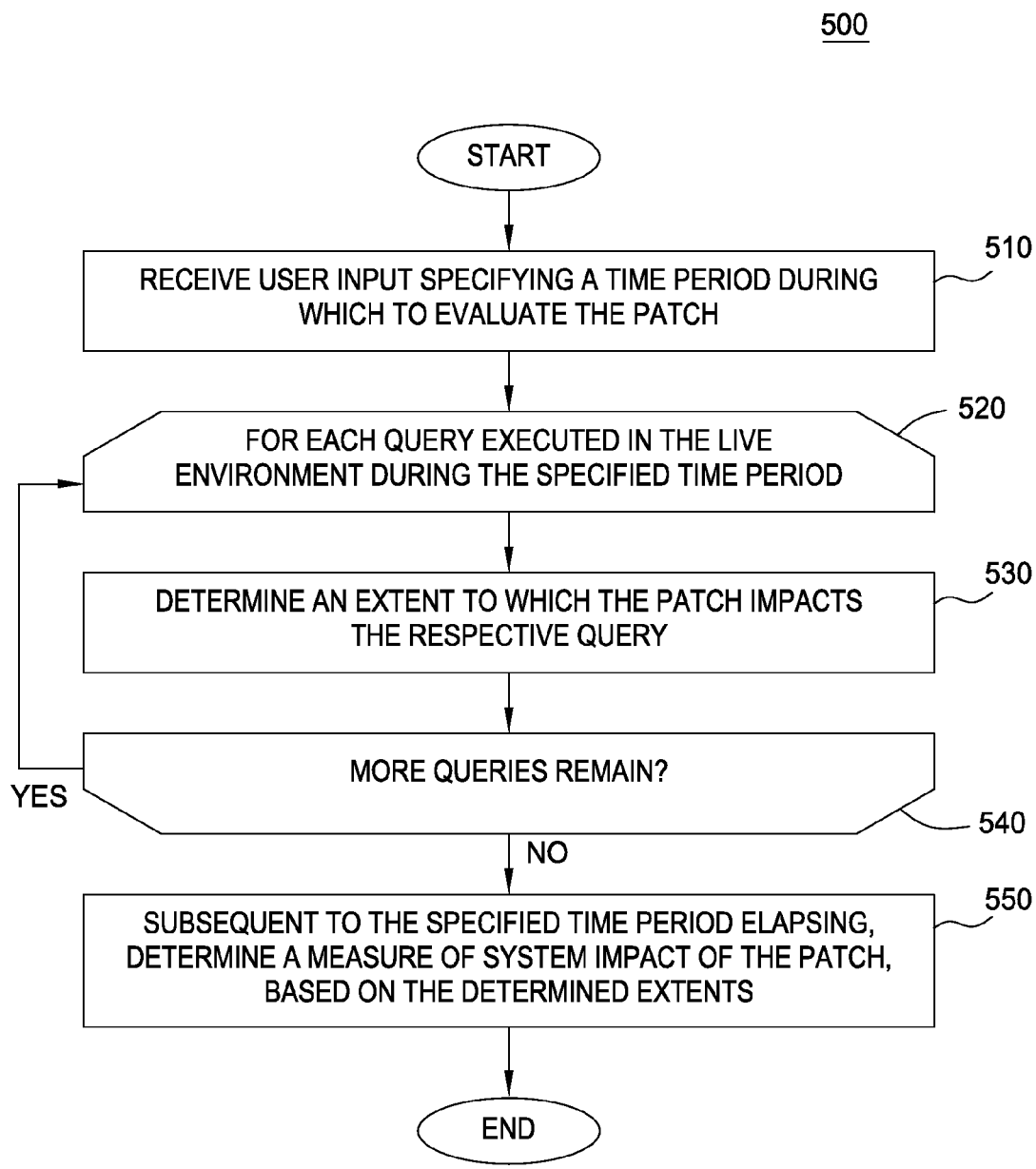
FIG. 5 is a flowchart depicting a method for determining a measure of system impact of installing the database patch, according to one embodiment of the invention.

FIG. 5 is a flowchart depicting a method 500 for determining a measure of system impact of installing the patch 158 of FIG. 1, according to one embodiment of the invention. As shown, the method 500 begins at step 510, where the DBMS 150 receives user input specifying a time period during which to evaluate the patch. At step 520, the DBMS 150 enters a loop for processing each query executed during the specified time period. At step 530, the DBMS 150 determines an extent to which the patch impacts the respective query. The extent may be expressed in terms of how much longer the respective query is expected to execute, relative to a last logged execution time of the respective query. At step 540, the DBMS 150 determines whether more queries remain to be processed. If so, the DBMS 150 returns to the step 520 to process a next query. Otherwise, the DBMS 150 determines a measure of system impact of the patch, based on the determined extents (step 550). The step 550 may be performed subsequent to the specified time period elapsing.

As an example, the measure of system impact may be determined by computing a numeric value based on the determined extents and a user-specified weighting factor assigned to each query. The weighting factor may characterize an extent to which the respective query is deemed to be timesensitive. In some embodiments, the measure of system impact is expressed in the form of the numeric value. The measure of system impact may also be expressed in the form of an indicator selected from multiple indicators along a predefined range of numeric values, based on the computed numeric value. As described above, each indicator characterizes the system impact: (i) as a positive impact or a negative impact and (ii) qualifies the positive or negative impact as low impact, medium impact, or high impact. After the step 550, the method 500 terminates.

Advantageously, embodiments of the invention provide techniques for identifying impact of a database patch. One embodiment of the invention provides a DBMS that is configured to manage one or more databases. The DBMS may receive a request to evaluate a patch for the DBMS. The DBMS provides a first execution environment that is not based on the patch and a second execution environment that is based on the patch. For each query, the DBMS compares a first access plan with a second access plan, where the first access plan is generated from the first execution environment and the second access plan is generated from the second execution environment. The DBMS identifies one or more queries having differing access plans, based on the comparisons. The DBMS may then notify an administrative user of the identified queries. Accordingly, the administrative user may more efficiently and/or conveniently access information relevant to deciding whether and/or how to proceed with a patch that is to be installed for the DBMS.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   receiving a request to evaluate a patch for a database management system (DBMS) configured to manage a database, wherein the DBMS provides a first execution environment that is not based on the patch, and wherein the database includes a first plurality of access plans generated based on the first execution environment, including an access plan generated based further on a received dynamic query, wherein the dynamic query is not associated with any access plan stored in the DBMS when the dynamic query is received;
   providing a second execution environment in the DBMS, based on the patch; and
   generating a second plurality of access plans based on the second execution environment; and
   by operation of one or more computer processors, comparing the first plurality of access plans with the second plurality of access plans to identify one or more queries impacted by the patch.

2. The computer-implemented method of claim 1, wherein the patch comprises a database patch to be installed for the database management system, and wherein the one or more queries are identified using user-specified code received via an exit program.

3. The computer-implemented method of claim 1, further comprising:
   receiving user input specifying a time period during which to evaluate the patch;
   determining, for each query executed during the specified time period, an extent to which the patch impacts the respective query; and
   subsequent to the specified time period elapsing, determining a measure of system impact of the patch, based on the determined extents.

4. The computer-implemented method of claim 1, wherein the patch is evaluated during a period of time and without causing any implementation change in any query being executed by the DBMS in the first execution environment during the period of time.

5. A computer program product, comprising:
   a non-transitory computer-readable storage medium having computer-readable program code embodied therewith, the computer-readable program code comprising:
   computer-readable program code configured to receive a request to evaluate a patch for a database management system (DBMS) configured to manage a database, wherein the DBMS provides a first execution environment that is not based on the patch, and wherein the database includes a first plurality of access plans generated based on the first execution environment, including an access plan generated based further on a received dynamic query, wherein the dynamic query is not associated with any access plan stored in the DBMS when the dynamic query is received;
   computer-readable program code configured to provide a second execution environment in the DBMS, based on the patch; and
   computer-readable program code configured to generate a second plurality of access plans based on the second execution environment; and
   computer-readable program code configured to compare the first plurality of access plans with the second plurality of access plans by operation of one or more computer processors when executing the computer-readable program code, to identify one or more queries impacted by the patch.

6. The computer program product of claim 5, wherein the patch comprises a database patch to be installed for the database management system, and wherein the one or more queries are identified using user-specified code received via an exit program.

7. The computer program product of claim 5, wherein the computer-readable program code further comprises:
   computer-readable program code configured to receive user input specifying a time period during which to evaluate the patch;
   computer-readable program code configured to determine, for each query executed during the specified time period, an extent to which the patch impacts the respective query; and
   computer-readable program code configured to determine, subsequent to the specified time period elapsing, a measure of system impact of the patch, based on the determined extents.

8. The computer program product of claim 5, wherein the patch is evaluated during a period of time and without causing any implementation change in any query being executed by the DBMS in the first execution environment during the period of time.

9. A system, comprising:
   one or more computer processors;
   a memory containing a program, which when executed by the one or more computer processors is configured to perform an operation comprising:
   receiving a request to evaluate a patch for a database management system (DBMS) configured to manage a database, wherein the DBMS provides a first execution environment that is not based on the patch, and wherein the database includes a first plurality of access plans generated based on the first execution environment, including an access plan generated based further on a received dynamic query, wherein the dynamic query is not associated with any access plan stored in the DBMS when the dynamic query is received;

providing a second execution environment in the DBMS, based on the patch; and generating a second plurality of access plans based on the second execution environment; and comparing the first plurality of access plans with the second plurality of access plans to identify one or more queries impacted by the patch.

10. The system of claim 9, wherein the patch comprises a database patch to be installed for the database management system, and wherein the one or more queries are identified using user-specified code received via an exit program.

11. The system of claim 9, wherein the operation further comprises:

receiving user input specifying a time period during which to evaluate the patch;

determining, for each query executed during the specified time period, an extent to which the patch impacts the respective query; and subsequent to the specified time period elapsing, determining a measure of system impact of the patch, based on the determined extents.

12. A computer-implemented method, comprising:

receiving a request to evaluate, during a specified time period, a patch for a database management system (DBMS) configured to manage a database, wherein the DBMS provides a first execution environment that is not based on the patch, and wherein the database includes a first plurality of access plans generated based on the first execution environment;

providing a second execution environment in the DBMS, based on the patch; and generating a second plurality of access plans based on the second execution environment;

by operation of one or more computer processors, comparing the first plurality of access plans with the second plurality of access plans to identify one or more queries executed during the specified time period and impacted by the patch;

determining, for each query executed during the specified time period, an extent to which the patch impacts the respective query; and subsequent to the specified time period elapsing, determining a measure of system impact of the patch, based on the determined extents.

13. The computer-implemented method of claim 12, further comprising:

assigning an indication to the patch based on the determined measure of system impact of the patch, wherein the indication is selected from one of: (i) a first indication specifying a positive system impact and (ii) a second indication specifying a negative system impact of the patch.

14. The computer-implemented method of claim 12, further comprising:

assigning an indication to the patch based on the determined measure of system impact of the patch, wherein the indication is selected from one of: (i) a first indication specifying a high system impact, (ii) a second indication specifying a medium system impact of the patch, and (iii) a third indication specifying a low system impact of the patch, wherein each indication is measured relative to one another.

15. A computer program product, comprising:

a non-transitory computer-readable storage medium having computer-readable program code embodied therewith, the computer-readable program code comprising:

computer-readable program code configured to receive a request to evaluate, during a specified time period, a patch for a database management system (DBMS) configured to manage a database, wherein the DBMS provides a first execution environment that is not based on the patch, and wherein the database includes a first plurality of access plans generated based on the first execution environment;

computer-readable program code configured to provide a second execution environment in the DBMS, based on the patch; and computer-readable program code configured to generate a second plurality of access plans based on the second execution environment;

computer-readable program code configured to compare the first plurality of access plans with the second plurality of access plans by operation of one or more computer processors when executing the computer-readable program code, to identify one or more queries executed during the specified time period and impacted by the patch;

computer-readable program code configured to determine, for each query executed during the specified time period, an extent to which the patch impacts the respective query; and computer-readable program code configured to, subsequent to the specified time period elapsing, determine a measure of system impact of the patch, based on the determined extents.

16. The computer program product of claim 15, wherein the computer-readable program code further comprises:

computer-readable program code configured to assign an indication to the patch based on the determined measure of system impact of the patch, wherein the indication is selected from one of: (i) a first indication specifying a positive system impact and (ii) a second indication specifying a negative system impact of the patch.

17. The computer program product of claim 15, wherein the computer-readable program code further comprises:

computer-readable program code configured to assign an indication to the patch based on the determined measure of system impact of the patch, wherein the indication is selected from one of: (i) a first indication specifying a high system impact, (ii) a second indication specifying a medium system impact of the patch, and (iii) a third indication specifying a low system impact of the patch, wherein each indication is measured relative to one another.

18. A system, comprising:

one or more computer processors;

a memory containing a program, which when executed by the one or more computer processors is configured to perform an operation comprising:

receiving a request to evaluate, during a specified time period, a patch for a database management system (DBMS) configured to manage a database, wherein the DBMS provides a first execution environment that is not based on the patch, and wherein the database includes a first plurality of access plans generated based on the first execution environment;

providing a second execution environment in the DBMS, based on the patch; and generating a second plurality of access plans based on the second execution environment;

comparing the first plurality of access plans with the second plurality of access plans to identify one or more queries executed during the specified time period and impacted by the patch;

determining, for each query executed during the specified time period, an extent to which the patch impacts the respective query; and subsequent to the specified time period elapsing, determining a measure of system impact of the patch, based on the determined extents.

19. The system of claim 18, wherein the operation further comprises:

assigning an indication to the patch based on the determined measure of system impact of the patch, wherein the indication is selected from one of: (i) a first indication specifying a positive system impact and (ii) a second indication specifying a negative system impact of the patch.

20. The system of claim 18, wherein the operation further comprises:

assigning an indication to the patch based on the determined measure of system impact of the patch, wherein the indication is selected from one of: (i) a first indication specifying a high system impact, (ii) a second indication specifying a medium system impact of the patch, and (iii) a third indication specifying a low system impact of the patch, wherein each indication is measured relative to one another.

* * * * *